H. J. & S. H. CARBIS.
AUTOMATIC STRAINER.
APPLICATION FILED MAR. 4, 1914.

1,120,595.

Patented Dec. 8, 1914.

Witnesses

H. J. Carbis and
S. H. Carbis, Inventors by C. A. Snow & Co.
Attorneys

UNITED STATES PATENT OFFICE.

HENRY J. CARBIS AND SAMUEL H. CARBIS, OF FREEPORT, PENNSYLVANIA, ASSIGNORS OF ONE-HALF TO THOMAS G. CORNELL, OF FREEPORT, PENNSYLVANIA.

AUTOMATIC STRAINER.

1,120,595.      Specification of Letters Patent.      Patented Dec. 8, 1914.

Application filed March 4, 1914. Serial No. 822,472.

*To all whom it may concern:*

Be it known that we, HENRY J. CARBIS and SAMUEL H. CARBIS, citizens of the United States, residing at Freeport, in the county of Armstrong and State of Pennsylvania, have invented a new and useful Automatic Strainer, of which the following is a specification.

The present invention appertains to automatic strainers, such as are employed in the feed lines for supplying water to boilers and the like.

It is the object of the present invention to provide a strainer of novel construction, which is so operable, that when it is interposed in a water line, it will ordinarily permit the flow of water therethrough to the boiler, the sediment and other extraneous matter being arrested in the strainer, and the accumulated sediment or foreign matter being capable of being discharged or ejected, by a reverse or backward pressure of the steam or pressure fluid.

The present invention also comprehends the production of an automatic strainer of the nature indicated, which shall be improved generally in its structure, whereby the device will be comparatively simple, compact and inexpensive in its construction, may be readily installed in various water lines, and will be convenient, serviceable, practical and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawings, wherein:—

Figure 1:
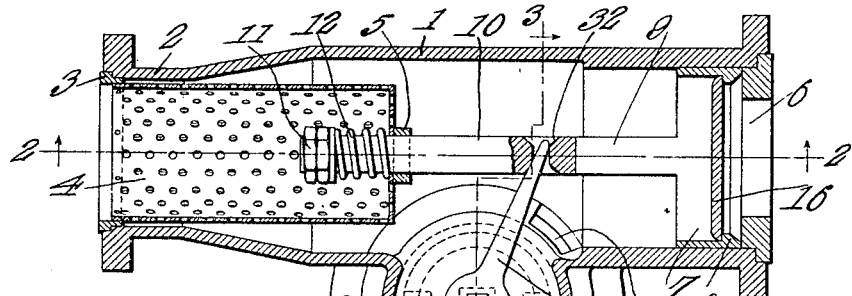
Figure 2:
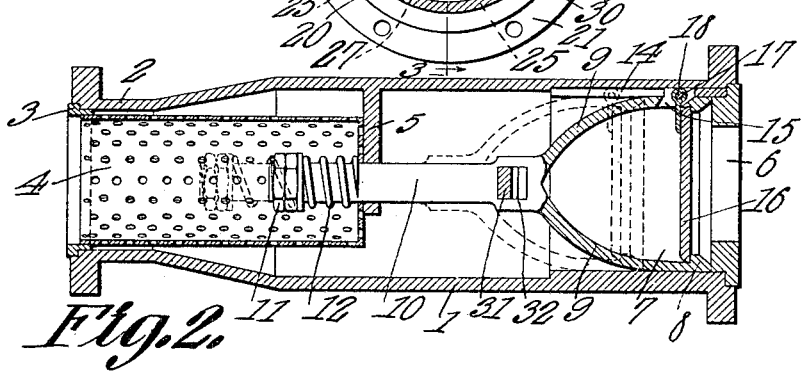
Figure 3:
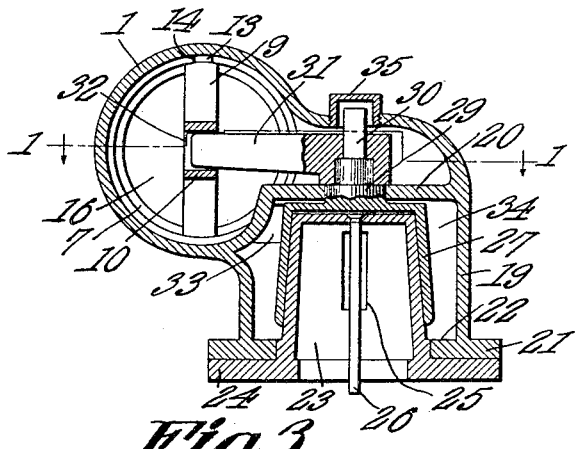
Figure 4:
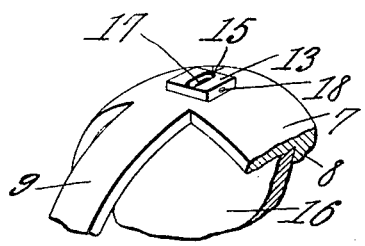

Figure 1 is a longitudinal horizontal section of the strainer, taken on the line 1—1 of Fig. 3. Fig. 2 is a vertical longitudinal section of the strainer, taken on the line 2—2 of Fig. 1. Fig. 3 is a cross section of the device, taken on the line 3—3 of Fig. 1. Fig. 4 is a fragmental perspective of a detail.

In carrying out the present invention, there is provided a horizontal cylindrical casing 1, one end of which is contracted or reduced in diameter, as at 2, and a gasket or annulus 3 is shrunk or otherwise secured within the reduced or contracted end 2 of the casing, and has riveted or otherwise secured thereto, a strainer 4. The strainer is cylindrical in form, and has one end open, the open end or mouth of the cylinder being secured within the gasket or ring 3, and the inner or closed end of the strainer abutting against a guide 5 provided upon the interior of the casing intermediate its ends. The strainer 4 projects into the central or body portion of the casing 1, in order that the liquid or fluid passing through the casing, may pass readily through the apertures or perforations of the strainer. Secured within the other end of the casing 1, is a gasket or annulus 6, which serves as a stop for a ring 7 which is slidable within the corresponding end portion of the casing, that edge portion of the ring 7 adjoining the gasket 6 being formed with an inner shoulder 8 forming a valve seat. To that edge of the ring or collar 7, remote from the gasket 6, is attached a fork or spider 9, having the integral stem 10 slidable through the guide 5 and the inner end of the strainer 4, the free end of the stem 10 being disposed within the strainer, and bearing adjustable nuts or stops 11. A coiled wire compression spring 12 is disposed upon the free portion of the stem 10 between the nuts or stops 11 and the inner end of the strainer 4, or the guide 5, whereby the spring 12 expanding or recoiling, will normally slide the ring or collar 7 away from the gasket 6, and toward the central portion of the casing.

The ring or collar 7 is provided at its top, with a lug 13, engaging within a longitudinal slot 14 within the corresponding end portion of the casing 1, to thereby restrain the collar or ring against rotatory movement, but permitting the same to slide longitudinally. A slot 15 extends through the lug 13 and the collar or ring 7, and a flap valve 16, which is seatable against the shoulder or seat 8, is provided with an eye 17 projecting into the slot 15 and pivoted therein by means of a pivot pin 18 extending through the lug 13. Thus, the flap valve 16 is adapted to swing within the ring or collar 7, and the fork or spider 9, to and from its seat 8, the collar or ring, which carries the flap valve, being slidable within the corresponding end portion of the casing, as above described. It is also to be observed that the valve seats toward the gasket 6, or the corresponding end of the casing, and serves as a check valve, as will hereinafter more fully appear.

The casing 1, is provided at one side and intermediate its ends, with a vertically arranged, or depending, cylindrical extension 19, the upper end portion of which is attached integrally to the casing 1. The extension or supplemental casing 19, is provided with a horizontal partition 20 adjoining its upper end, and which separates the interior of the casing 1, from the interior of the body portion of the extension or auxiliary casing 19, it being observed that intermediate the partition 20 and the bottom of the casing 1, the casing 1 and the supplemental casing 19 have a common wall or partition, as clearly seen in Fig. 3. The lower or free end of the chamber 19 is provided with interior and exterior flanges 22 and 21, respectively, and a frusto-conical member 23 has its basal portion engaged within the restricted opening formed by the interior or inturned flange 22 of the supplemental casing 19, the member 23 being hollow, having its upper end closed, and having an outturned or exterior flange 24 at its lower end or basal portion, and bolted or otherwise fastened to the outturned flange 21 of the extension or shell 19. The upper end of the frusto-conical member 23 terminates slightly below or short of the partition 20, and is provided at diametrically opposite portions with lateral, vertically, elongated ports 25. A stem or rod 26 is disposed axially within the member 23, and has its upper end engaged through the top or upper end of the said member, the said stem or rod 26 depending within the member 23.

A tapered or frusto-conical cap 27 is disposed snugly over the frusto-conical member 23, the latter member being stationary, while the cap 27 is mounted for oscillatory movements on the member 23, the apron or rim portion of the cap or member 27, being provided with lateral, vertical, elongated ports 28 which are adapted to be brought into and out of registration with the ports 25 of the member 23. The top of the cap or valve 26 is provided with a central boss 29 journaled through an aperture or opening formed in the partition 20, and the boss 29 is provided with an upstanding, non-circular in cross section, extension 30 over which is engaged the butt end of an arm or finger 31, the free end of the arm or finger engaging within an opening or recess 32 formed in the stem 10, whereby the reciprocatory or rectilinear motion of the stem 10 will impart an oscillatory movement to the valve 27 for bringing the ports 28 of the valve into and out of registration with the ports 25 of the discharge member 23. The parts are so arranged that when the stem 10 is slid in one direction, under the influence of the spring 12, to move the collar or ring 7 away from the gasket 6, the ports 28 of the valve 27 will be moved out of registration with the ports 25 of the discharge member 23, and whereby when the stem 10 is moved in the other direction to bring the sleeve or ring 7 adjoining the gasket 6, the ports 28 will be brought into register with the ports 25.

The casing 1 is provided with a lateral port or passage 33 extending from its interior to the chamber 34 within the shell or extension 19, the chamber or compartment 34, being annular and surrounding the valves 27 and the discharge member or valve 23. The port 33 extends approximately tangential relative to the annular chamber 34, and is arranged at the upper end of said chamber.

The upper end or top of the extension or auxiliary chamber 19 is provided with a removable closure or plug 35 disposed over the extension 30, whereby the extension 30 may be exposed by removing the closure or plug 35 when circumstances necessitate or justify. In this manner, when the device is out of order, access may be had to the extension 30, without opening the entire device.

Although the present strainer is applicable to various boiler feed lines, it is particularly adapted for the feed lines of locomotives, leading from the tender to the injector or inspirator of the locomotive. The casing 1 may be readily interposed in the feed line or pipe, the contracted or restricted end 2 of the casing being connected to the locomotive boiler, while the other end of the casing is connected to the tender or source of water supply, whereby the water in flowing through the casing 1 may readily pass beyond the flap valve 16, which opens under the pressure of the water, the water thence passing through the strainer 4 and to the boiler, it being understood that the water is usually drawn from the tender or source of supply, by an injector or inspirator. The water being drawn through the strainer 4, will cause the water to be strained in passing through the cylinder 1, the sediment or other extraneous matter accumulating within the cylinder 1. When the device is in its normal position, for permitting of the passage of water therethrough, as above indicated, the stem 10 is slid toward the end 2 of the casing, to thereby move the ring or sleeve 7 away from the gasket 6 or the corresponding end of the casing, and to close the valve 27.

To discharge or eject the accumulated sediment or foreign matter from the casing 1, steam is let into the casing 1, from the boiler, through the strainer 4, which will force the sediment and other accumulations backward away from the strainer, and at the same time, the flap or check valve 16, will be swung against its seat 8, and the pressure of the steam or fluid against the valve 16 will slide the collar or ring 7 toward or against the gasket 6, against the tension of the spring 12, to thereby swing or oscillate the arm or finger 31, to open the valve 27, as above indicated. The ports 28 of the valve 27 being brought into register with the ports 25 of the member 23 will establish communication with the atmosphere, to enable the steam to escape, the steam passing through the port 33 into the annular chamber 34, and thence through the outlet ports 28 and 25 to the discharge member 23. In this manner, the steam will carry with it, the sediment and other accumulations, there being a tendency to create a whirling action of the steam within the annular chamber 34, in order that the precipitated matter or sediment will be kept in motion or in suspension, to enable the foreign matter to be properly carried out through the ports 28 and 25 with the steam. As soon as the foreign matter is ejected from the casing, the steam is shut off from the strainer, which will relieve the valve 16, and consequently, the sleeve or collar 7 will return to its initial position, under the influence of the spring 12, and at the same time, the valve 27 will be rotated or swung to closed position. The device will then be again in condition for use, the accumulations having been discharged, to leave the water free to flow through the casing without interference.

Attention is directed to the fact that it is first necessary for the steam to close the flap valve 16 and then to force the ring or carrier 7 of the valve 16 toward or against the gasket 6, before the valve 27 is opened, to permit of the escape of the steam. This eliminates the possibility of the steam passing the valve 16, as it would be liable to carry part of the sediment back into the supply pipe.

The present appliance enables the engineer or engine man to clear the strainer at suitable intervals, by merely letting steam back into the strainer, the entire operation of the device being automatic.

The several component parts of the present device may be readily assembled and taken apart for cleaning, repair or replacement, the other advantages and capabilities of the device being apparent from the foregoing, taken in connection with the drawing.

Having thus described the invention, what is claimed as new is:—

1. An automatic strainer embodying a casing, a strainer and a check valve arranged therein, the casing having discharge means intermediate the strainer and check valve, a valve for controlling the passage through the said means, and means operatively connecting the two valves, for operating the second mentioned valve from the check valve.

2. An automatic strainer embodying a casing, a straining member disposed therein, a ring slidable within the casing and having a valve seat, a check valve carried by the ring and coöperating with the said seat, the casing having discharge means intermediate the straining member and said ring, a valve controlling the passage through the discharge means, and means operatively connecting the said ring and second mentioned valve for opening and closing the second mentioned valve as the ring is moved within the casing.

3. An automatic strainer embodying a casing, a straining element disposed within the casing, a spring pressed ring slidable within the casing and having a valve seat, a check valve carried by the ring and coöperable with the said seat, the casing having discharge means intermediate the straining element and said ring, an oscillatory valve controlling the passage through the said discharge means and operatively connected with the said ring.

4. An automatic strainer embodying a casing, a straining element inclosed therein, a ring slidable within the casing and having a valve seat, a guide mounted within the casing intermediate the straining element and said ring, a stem slidable through the guide and having a spider attached to the said ring, a spring disposed between the guide and stem for normally moving the ring toward the guide, a check valve carried by the ring and coöperable with the said seat, the casing having discharge means intermediate the straining element and said ring, and a valve for controlling the passage through the discharge means and operatively connected with the said stem for opening and closing the second mentioned valve as the ring is moved away from and toward the said guide.

5. An automatic strainer embodying a casing, a straining element inclosed therein, a ring slidable within the casing and having a valve seat, a guide mounted within the casing intermediate the straining element and said ring, a stem slidable through the guide and having a spider attached to the said ring, a spring disposed between the guide and stem for normally moving the ring toward the guide, a check valve carried by the ring and coöperable with the said seat, the casing having discharge means at one side and intermediate the straining element and said ring, an oscillatory valve for controlling the passage through said discharge means, and an arm carried by the second mentioned valve and having its free end operatively engaged to the said stem for opening and closing the second mentioned valve as the ring is moved away from and toward the guide.

6. An automatic strainer embodying a casing, a straining element disposed therein, a check valve mounted within the casing, the casing having an extension intermediate the straining element and check valve, a valve mounted within the said extension and arranged to open and close the passage therethrough, and means operatively connecting the two valves for controlling the second mentioned valve by the check valve.

7. An automatic strainer embodying a casing, a straining element and a check valve disposed therein, the casing having a discharge extension intermediate the straining element and valve, an oscillatory valve disposed within the said extension, the oscillatory valve and extension having ports adapted to be brought into and out of registration, and means operatively connecting the two valves for actuating the oscillatory valve through the medium of the check valve.

8. An automatic strainer embodying a casing, a straining element and a check valve mounted therein, the casing having a discharge extension intermediate the said strainer and check valve, there being a partition between the interior of the casing and the chamber formed by the said extension, the said partition having a port therein, a valve disposed within the said chamber for controlling the outlet passage of the said extension, the second mentioned valve having a stem engaging through the said partition, and means operatively connecting the said stem and the check valve for actuating the second mentioned valve by the check valve.

9. An automatic strainer embodying a casing, a straining element and a check valve mounted therein, the casing having a discharge extension intermediate the said strainer and check valve, there being a partition between the interior of the casing and the chamber formed by the extension, the partition having a port therein, an oscillatory valve disposed within the said extension and having a stem engaging through said partition, the said extension and oscillatory valve having ports adapted to be brought into and out of registration, and means operatively connecting the said stem and the check valve for actuating the oscillatory valve from the check valve.

10. An automatic strainer embodying a casing, a straining element and a check valve mounted therein, the casing having an extension intermediate the said strainer and check valve, a hollow discharge member mounted within the extension, a valve mounted upon the said discharge member, the discharge member and second mentioned valve having ports adapted to move into and out of register, and means operatively connecting the valve for actuating the second mentioned valve, by the check valve.

11. An automatic strainer embodying a casing, a straining element and a check valve mounted therein, the casing having an extension intermediate the straining element and check valve, there being a partition between the interior of the casing and the chamber formed by the extension, the said partition having a port therein, a hollow discharge member mounted within the extension and having lateral ports therein, an oscillatory valve mounted on the discharge member and having ports adapted to be brought into registration with the ports of the discharge member, the oscillatory valve having a stem engaging through the said partition, and means operatively connecting the said stem and check valve for oscillating the oscillatory valve when the check valve is moved.

12. An automatic strainer embodying a casing, a straining element and a check valve mounted therein, the casing having a depending extension provided with an opening at its lower end, a hollow discharge member secured within the said opening and projecting into the extension, the discharge member having outlet ports therein, an oscillatory valve mounted on the discharge member and having ports adapted to be brought into and out of registration with the aforesaid ports, and means operatively connecting the two valves, whereby the oscillatory valve will be actuated by the check valve.

13. An automatic strainer embodying a casing, a straining element and a check valve mounted therein, the casing having a depending extension intermediate the said straining element and check valve, the extension having an opening at its lower end, there being a partition between the interior of the casing and the chamber formed by the extension, the said partition having a port therein, a hollow discharge member secured within the casing and projecting into the said chamber, an oscillatory valve mounted over the discharge member and having a stem engaging through the said partition, the oscillatory valve and discharge member having ports adapted to move into and out of registration, and means operatively connecting the said stem and check valve.

14. An automatic strainer embodying a casing, a straining element secured therein, a sleeve slidable in the casing and having a valve seat, a check valve carried by the sleeve and coöperable with the said seat, yieldable means for moving the sleeve toward the straining element, the casing having an extension intermediate the straining element and said sleeve, the extension having discharge means, a valve mounted within the extension and coöperable with the said discharge means for controlling the passage therethrough, and means operably connecting the second mentioned valve and sleeve for opening and closing the second mentioned valve when the sleeve is moved toward and away from the straining element, respectively.

15. An automatic strainer embodying a casing, a straining element secured therein, a sleeve slidable within the casing and having a valve seat, a check valve carried by the sleeve and coöperable with the said seat, the casing having an extension intermediate the said straining element and sleeve, an oscillatory valve mounted within the extension and operatively connected with the said sleeve, the extension having discharge means, and the said discharge means and oscillatory valve having ports adapted to be brought into and out of registration when the sleeve is moved away from and toward the straining element, respectively.

16. An automatic strainer embodying a casing, a straining element secured therein, a ring slidable within the casing and having a valve seat, a stem attached to the ring, a check valve carried by the ring and coöperable with the seat, yieldable means coöperable with the said stem for normally moving the ring toward the straining element, the casing having a depending extension at one side and provided with discharge means, an oscillatory valve mounted within the extension for controlling the passage through the said discharge means, and an arm secured to the oscillatory valve and having its free end operatively engaged to the said stem.

17. An automatic strainer embodying a casing, a straining element secured therein, a ring slidable within the casing and having a valve seat, a stem attached to the ring, a check valve carried by the ring and coöperable with the said seat, the casing having a depending extension at one side, the extension having discharge means, there being a partition between the casing and the chamber formed by the said extension, the partition having a port, an oscillatory valve mounted within the said chamber for controlling the passage through the discharge means, the valve having a stem engaging through the said partition, and an arm secured to the second mentioned stem and having its free end operatively engaged to the first mentioned stem.

18. An automatic strainer embodying a casing, a straining element secured therein, a sleeve slidable within the casing and having a valve seat, a check valve carried by the sleeve and coöperable with the said seat, the casing having a depending extension at one side, intermediate the straining element and sleeve, the extension having a lower opening, a hollow discharge member secured within the said opening and projecting into the extension, an oscillatory valve mounted on the discharge member and operatively connected to the said sleeve, and the discharge member and oscillatory valve having parts adapted to be brought into and out of registration when the sleeve is moved away from and toward the straining element, respectively.

19. An automatic strainer embodying a casing, a straining element secured therein, a sleeve slidable within the casing and having a valve seat, a check valve carried by the sleeve and coöperable with the said seat, the casing having a depending extension at one side intermediate the straining element and sleeve, the extension having a lower opening, there being a partition between the interior of the casing and the chamber formed by the extension, the said partition having a port, a hollow discharge member secured within the said opening and projecting into the said chamber, an oscillatory valve mounted over the discharge member and having a stem engaging through the said partition, the oscillatory valve and discharge member having ports adapted to be brought into and out of registration, and means operatively connecting the stem and sleeve.

20. An automatic strainer embodying a casing, a straining element secured therein, a sleeve slidable within the casing and having a valve seat, a check valve carried by the sleeve and coöperable with the seat, the casing having a depending extension at one side intermediate the straining element and sleeve, a hollow discharge member mounted within the extension, an oscillatory valve mounted on the discharge member, the discharge member and oscillatory valve having ports adapted to be brought into registration, and means operatively connecting the oscillatory valve and sleeve.

21. An automatic strainer embodying a casing, a straining element secured therein, a sleeve slidable within the casing and having a valve seat, a check valve carried by the sleeve and coöperable with the said seat, the casing having a depending extension at one side intermediate the straining element and sleeve, there being a partition between the interior of the casing and the chamber formed by the said extension, the partition having a port, a hollow discharge member mounted within the said chamber, an oscillatory valve mounted upon the discharge member and having a stem engaging through the said partition, the discharge member and oscillatory valve having ports adapted to be brought into and out of registration, and means operatively connecting the said stem and sleeve.

In testimony that we claim the foregoing as our own, we have hereto affixed our signatures in the presence of two witnesses.

HENRY J. CARBIS.
SAMUEL H. CARBIS.

Witnesses:
JOHN B. PATTERSON,
M. E. KENNEDY.

Copies of this patent may be obtained for five cents each, by addressing the "Commissioner of Patents, Washington, D. C."